United States Patent
Püskül

(10) Patent No.: US 12,480,771 B2
(45) Date of Patent: Nov. 25, 2025

(54) VEHICULAR TRAINING SYSTEM FOR DRIVING ASSISTANCE SYSTEM

(71) Applicant: Magna Electronics Inc., Auburn Hills, MI (US)

(72) Inventor: Özgür Nurettin Püskül, Ellerbek (DE)

(73) Assignee: Magna Electronics Inc., Auburn Hills, MI (US)

( * ) Notice: Subject to any disclaimer, the term of this patent is extended or adjusted under 35 U.S.C. 154(b) by 119 days.

(21) Appl. No.: 18/503,213

(22) Filed: Nov. 7, 2023

(65) Prior Publication Data

US 2024/0151540 A1    May 9, 2024

Related U.S. Application Data

(60) Provisional application No. 63/382,762, filed on Nov. 8, 2022.

(51) Int. Cl.

| | |
|---|---|
| *G01C 21/34* | (2006.01) |
| *G01C 21/36* | (2006.01) |
| *G06V 10/75* | (2022.01) |
| *G06V 20/56* | (2022.01) |
| *G06V 20/58* | (2022.01) |

(52) U.S. Cl.
CPC ..... *G01C 21/3453* (2013.01); *G01C 21/3602* (2013.01); *G06V 10/75* (2022.01); *G06V 20/582* (2022.01); *G06V 20/588* (2022.01)

(58) Field of Classification Search
CPC ............ G01C 21/3453; G01C 21/3602; G01C 21/3415; G01C 21/3837; G01C 21/3848; G06V 10/75; G06V 20/582; G06V 20/588

USPC ........................................................ 701/411
See application file for complete search history.

(56) References Cited

U.S. PATENT DOCUMENTS

| | | | |
|---|---|---|---|
| 5,550,677 | A | 8/1996 | Schofield et al. |
| 5,670,935 | A | 9/1997 | Schofield et al. |
| 5,949,331 | A | 9/1999 | Schofield et al. |
| 7,038,577 | B2 | 5/2006 | Pawlicki et al. |
| 7,720,580 | B2 | 5/2010 | Higgins-Luthman |
| 7,855,755 | B2 | 12/2010 | Weller et al. |
| 10,071,687 | B2 | 9/2018 | Ihlenburg et al. |
| 10,099,614 | B2 | 10/2018 | Diessner |
| 10,406,980 | B2 * | 9/2019 | Schofield .............. G01S 13/931 |
| 11,586,204 | B2 * | 2/2023 | Potnis .................. B60W 30/182 |
| 12,106,583 | B2 * | 10/2024 | Potnis .................. G06V 20/588 |
| 12,233,917 | B2 | 2/2025 | Barragan et al. |

(Continued)

*Primary Examiner* — Muhammad Shafi
(74) *Attorney, Agent, or Firm* — HONIGMAN LLP

(57) ABSTRACT

A vehicular training system includes a sensor disposed at a vehicle and sensing exterior of the vehicle. The sensor is operable to capture sensor data. An electronic control unit (ECU) includes electronic circuitry and associated software, with the electronic circuitry of the ECU including a data processor for processing sensor data captured by the sensor. The vehicular training system, while the vehicle travels along the route for the data collection drive and while the sensor captures sensor data, compares a quantity of sensor data that is captured to a target quantity of sensor data to be captured by the vehicular training system for training an advanced driving assistance system. The vehicular training system adjusts the route of the vehicle based at least in part on comparison of the quantity of sensor data that is captured and the target quantity of sensor data.

14 Claims, 2 Drawing Sheets

(56) References Cited

U.S. PATENT DOCUMENTS

| | | | |
|---|---|---|---|
| 2019/0073541 A1* | 3/2019 | Koravadi | G06V 20/588 |
| 2020/0001856 A1* | 1/2020 | Johnson | B60W 30/0956 |
| 2022/0048566 A1* | 2/2022 | Prasad Challa | B60W 40/04 |
| 2022/0114374 A1* | 4/2022 | Khatri | G06T 7/70 |
| 2022/0176960 A1* | 6/2022 | Awathe | G06V 20/58 |
| 2023/0008230 A1* | 1/2023 | Cordeiro | G06V 20/588 |
| 2024/0119873 A1 | 4/2024 | Püskül | |
| 2024/0142267 A1 | 5/2024 | Potnis et al. | |
| 2024/0144658 A1 | 5/2024 | Potnis | |
| 2025/0061734 A1 | 2/2025 | Potnis et al. | |

\* cited by examiner

VEHICULAR TRAINING SYSTEM FOR DRIVING ASSISTANCE SYSTEM

CROSS REFERENCE TO RELATED APPLICATION

The present application claims the filing benefits of U.S. provisional application Ser. No. 63/382,762, filed Nov. 8, 2022, which is hereby incorporated herein by reference in its entirety.

FIELD OF THE INVENTION

The present invention relates generally to a vehicle vision system for a vehicle and, more particularly, to a vehicle vision system that utilizes one or more cameras or other imaging sensors at a vehicle.

BACKGROUND OF THE INVENTION

Use of imaging sensors in vehicle imaging systems is common and known. Examples of such known systems are described in U.S. Pat. Nos. 5,949,331; 5,670,935 and/or 5,550,677, which are hereby incorporated herein by reference in their entireties.

SUMMARY OF THE INVENTION

A vehicular training system includes a sensor disposed at a vehicle equipped with the vehicular training system and sensing exterior of the vehicle. The sensor is operable to capture sensor data. The system includes an electronic control unit (ECU) with electronic circuitry and associated software. The electronic circuitry of the ECU includes a data processor for processing sensor data captured by the sensor. Sensor data captured by the sensor is transferred to and is processed at the ECU. The vehicular training system, while the vehicle travels along a route for a data collection drive and while the sensor captures sensor data, determines, via processing at the ECU of sensor data captured by the sensor and transferred to the ECU, a quantity of sensor data that has been captured for training an advanced driving assistance system. The vehicular training system, while the vehicle travels along the route for the data collection drive and while the sensor captures sensor data, compares the quantity of sensor data that is captured to a target quantity of sensor data to be captured by the vehicular training system for training the advanced driving assistance system. The vehicular training system adjusts the route of the vehicle based at least in part on comparison of the quantity of sensor data that is captured and the target quantity of sensor data.

These and other objects, advantages, purposes and features of the present invention will become apparent upon review of the following specification in conjunction with the drawings.

DESCRIPTION OF THE PREFERRED EMBODIMENTS

A vehicle sensing system and/or driver or driving assist system and/or object detection system operates to capture images exterior of the vehicle and may process the captured image data to display images and to detect objects at or near the vehicle and in the predicted path of the vehicle, such as to assist a driver of the vehicle in maneuvering the vehicle in a rearward direction. The vision system includes an image processor or image processing system that is operable to receive image data from one or more cameras or other imaging sensors (e.g., radar, lidar, etc.) and provide an output to a display device for displaying images representative of the captured image data. Optionally, the vision system may provide a display, such as a rearview display or a top down or bird's eye or surround view display or the like.

Figure 1:
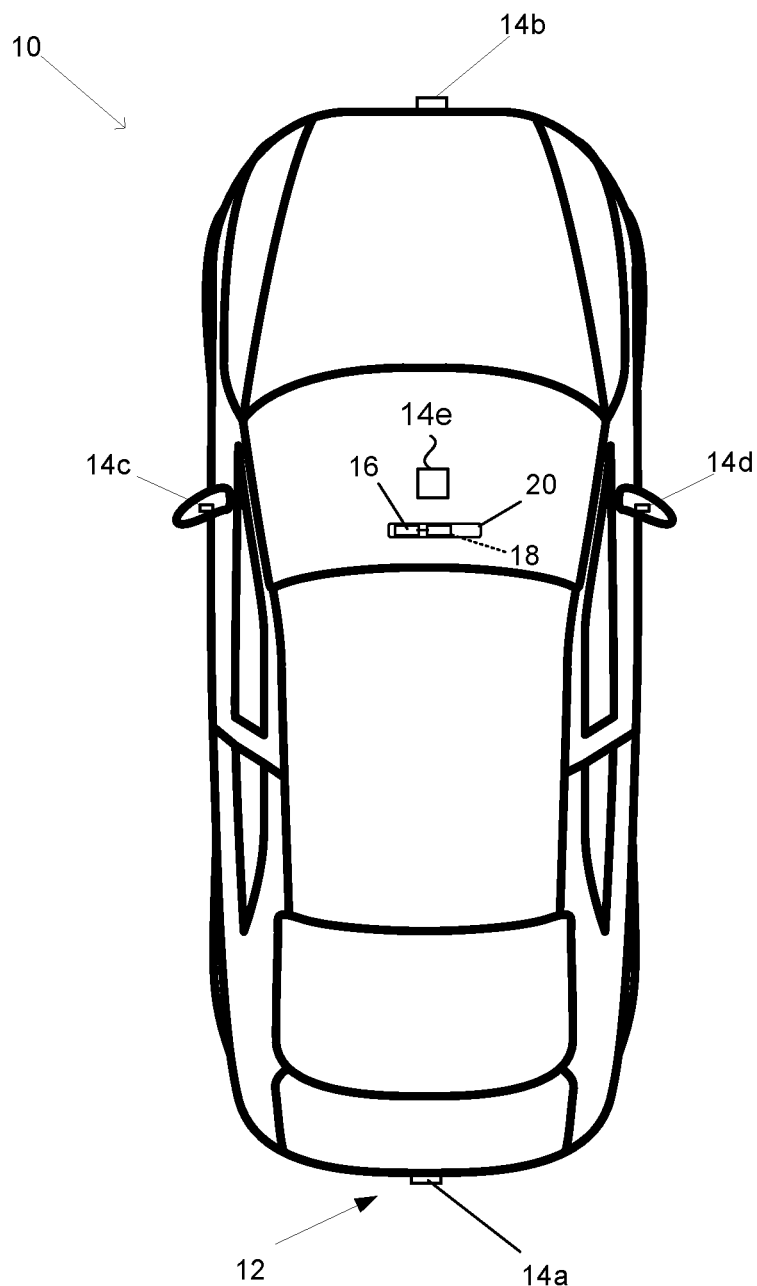
FIG. 1 is a plan view of a vehicle with a vision system that incorporates a plurality of sensors.

Referring now to the drawings and the illustrative embodiments depicted therein, a vehicle 10 includes a sensing system or vision system 12 that includes at least one exterior sensing sensor, such as at least one exterior viewing imaging sensor or camera, such as a rearward viewing imaging sensor or camera 14a (and the system may optionally include multiple exterior viewing imaging sensors or cameras, such as a forward viewing camera 14b at the front of the vehicle (or at an in-cabin side of the windshield of the vehicle and viewing forward through the windshield of the vehicle), and a sideward/rearward viewing camera 14c, 14d at respective sides of the vehicle), which captures images exterior of the vehicle, with the camera having a lens for focusing images at or onto an imaging array or imaging plane or imager of the camera (FIG. 1). Optionally, a forward viewing camera 14e may be disposed at the windshield of the vehicle and view through the windshield and forward of the vehicle, such as for a machine vision system (such as for traffic sign recognition, headlamp control, pedestrian detection, collision avoidance, lane marker detection and/or the like). The vision system 12 includes a control or electronic control unit (ECU) 18 having electronic circuitry and associated software, with the electronic circuitry including a data processor or image processor that is operable to process image data captured by the camera or cameras, whereby the ECU may detect or determine presence of objects or the like and/or the system provide displayed images at a display device 16 for viewing by the driver of the vehicle (although shown in FIG. 1 as being part of or incorporated in or at an interior rearview mirror assembly 20 of the vehicle, the control and/or the display device may be disposed elsewhere at or in the vehicle). The data transfer or signal communication from the camera to the ECU may comprise any suitable data or communication link, such as a vehicle network bus or the like of the equipped vehicle.

Large amounts of data collection is generally required for functional performance testing of most advanced driver assistance systems (ADAS), such as systems supported by the sensor system of FIG. 1. Such large amounts of data can create many challenges. For example, generally a vehicle will perform a data collection route or drive where the sensors of the vehicle (e.g., one or more cameras, radar sensors, lidar, GPS sensors, etc.) collect data pertaining to performance of one or more ADAS functions. After the data collection drive is complete, the recorded sensor data is removed from the vehicle and processed to determine whether key performance indicators (KPIs) were achieved. The KPIs may require certain quantities of sensor data be recorded in certain scenarios or during certain events. For instance, KPIs may require that sufficient sensor data be recorded in different weather conditions, during different traffic maneuvers, on different road types, etc. As a specific example, one KPI may indicate that at least a threshold number of frames of image data must be captured by one or more cameras disposed at the vehicle during sunny weather and/or on a highway. Generally, when it is determined that one or more of the KPIs were not satisfied (e.g., insufficient sensor data that satisfies the requirements of the KPI was recorded), another data collection drive must be scheduled and performed in an attempt to complete the KPIs. This is expensive and time consuming.

Implementations herein include systems and methods for an online scenario detector within a data logger of a data collection system. The online scenario detector preprocesses the recorded sensor data in real-time or near real-time as the data is captured by the sensors to identify, for example, scenarios, traffic signs, traffic situations, types of areas (e.g., urban, highway, etc.), weather conditions, lighting conditions, and the like. The online scenario detector may compare the determined scenarios against the required KPIs and, in real-time during the data collection drive, inform an occupant of the vehicle of the (e.g., a driver and/or co-driver) of a status of the recorded sensor data versus the required KPIs. For example, the online scenario detector, based on processing the recorded sensor data, may inform the occupant that a certain KPI is 50% complete, while another KPI is 0% complete, and yet another KPI is 100% complete. The KPI may be satisfied when a threshold number of events are detected and/or when a threshold amount or length of data is recorded or for any other appropriate conditions. The occupant of the vehicle may adjust the remainder of the data collection drive accordingly to ensure completion of KPIs in an optimal manner. For example, when the online scenario detector indicates that the KPI associated with urban traffic is complete but the KPI associated with highway traffic is not complete, the data collection drive may be redirected toward geographic areas more likely to acquire highway traffic sensor data. The captured data may be used to train one or more models, systems, or algorithms of a vehicle. For example, the sensor data may be used to train a machine learning model of an advanced driving assistance system (ADAS).

In some examples, the online scenario detector determines or adjusts a planned path of the vehicle to optimally complete KPIs. The online scenario detector integrates or accesses a map database to determine a nearest location appropriate for completing one or more KPIs. For example, when a KPI includes recording a threshold amount of highway driving, the online scenario detector may determine that the KPI has yet to be satisfied, and plot a route of the vehicle that includes sufficient highway driving to satisfy the KPI. The online scenario detector may access any number of databases or other data sources to assist in planning the route. For example, the online scenario detector may access a weather database, a map database, a geographic database, etc. The online scenario detector may integrate with a navigation system of the vehicle to automatically generate or adjust planned routes for the vehicle. The navigation system may provide navigation guidance (e.g., via one or more displays, audio notifications, etc.) to the driver of the vehicle for the new or updated route. In some implementations, the vehicle operates autonomously or semi-autonomously, and in these implementations, the vehicle may automatically begin navigation of the updated route.

Figure 2:
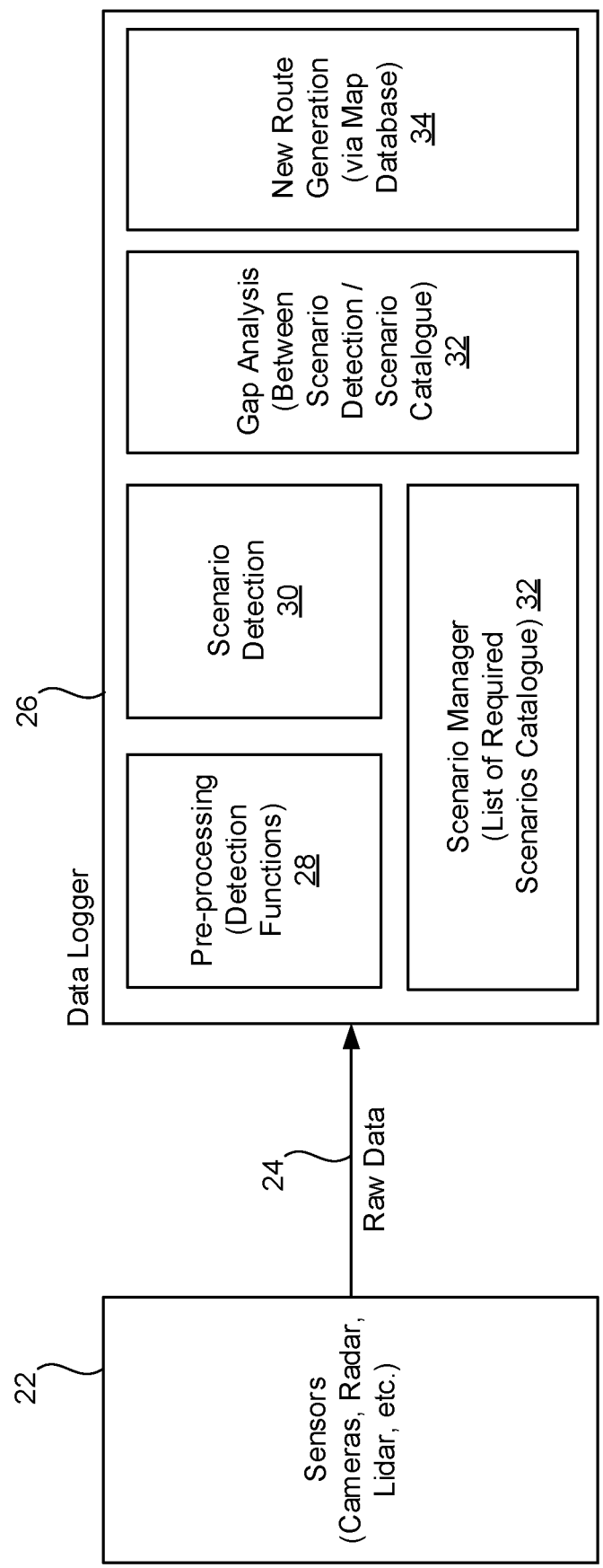
FIG. 2 is a block diagram of a data collection system for the vision system of FIG. 1.

Referring now to FIG. 2, the sensing system captures raw sensor data 24 using one or more sensors 22 (e.g., one or more cameras, radar sensors, lidar sensors, ultrasonic sensors, GPS sensors, etc.) disposed at a vehicle while the vehicle performs a data collection drive. A data logger 26 receives the sensor data 24 and pre-processes the sensor data 24 by, for example, executing one or more detection functions looking for predetermined or dynamic trigger conditions among the raw sensor data 24. For example, a sensor data pre-processing module 28 analyzes the sensor data 24 for one or more potential trigger conditions (e.g., detected objects). The sensor data pre-processing module 28 may include one or more models (e.g., a machine learning) trained or configured to detect the trigger conditions.

The data logger 26 includes a scenario detector 30. The scenario detector 30 retrieves a list of required scenarios (e.g., scenarios derived from one or more KPIs) for the collection drive from a scenario manager 32. The scenario detector 30 compares the trigger conditions detected by the sensor data pre-processing module 28 to the required scenarios to determine if any of the detected events from the trigger conditions satisfies any of the required scenarios. The scenario manager 32 may include a database or other storage means for storing the KPIs and/or scenarios derived from the KPIs.

The data logger 26 includes a gap analyzer 32 that compares parameters of the detected scenarios from the scenario detector 30 to the requirements of the KPIs (i.e., data collection quotas). That is, the gap analyzer 32 determines a status of or a delta between the current status of the sensor data and one or more data collection quotas derived from one or more KPIs. For example, the gap analyzer 32 may determine that a particular number of frames of image data captured during sunny weather are required to satisfy a KPI. A route generator 34 generates or updates a planned route of the vehicle based on the gap analysis performed by the gap analyzer 32. More specifically, the router generator 34 alters the planned route of the vehicle to more efficiently complete any remaining unsatisfied KPIs. The route generator 34 may access one or more databases (e.g., map databases, weather databases, etc.) to acquire the information necessary to generate the route. For example, when the gap analyzer 32 indicates that a KPI associated with acquiring sensor data while the vehicle travels along a highway, the route generator 34 may access a map database to generate or adjust the route of the vehicle to direct the vehicle toward a highway. In this example, the new route may include an amount of highway traveling to satisfy KPI. The gap analyzer 32 may periodically reevaluate the gap analysis to determine whether an additional update to the route is required (e.g., once a minute, once every five minutes, once every ten minutes, etc.).

Thus, based on the detection function(s), the data logger 26 determines or detects one or more scenarios captured in the sensor data. Based on the determined scenarios, the data logger 26 updates a status of a data collection quota and compares the current status of the data collection quota to a list of required or desired scenarios (e.g., stored via a scenario manager or scenario catalog). Based on the current status of the quota (e.g., via gap analysis between the scenario catalog and the scenarios detected in the sensor data), the data logger 26 adjusts a route of the vehicle (e.g., using one or more map databases or the like) configured to increase the status of the data collection quota.

The online scenario detector may process captured sensor data from a vehicle in real-time or near real-time. The online scenario detector may accordingly update status of collection requirements or KPIs or quotas as sensor data is captured and processed. The online scenario detector may compare the current status of the KPIs versus the desired or completed status of the KPIs and create or generate a route or path or plan for the vehicle to follow to assist in completing one or more KPIs. Thus, the online scenario detector may dynamically create paths or routes for the vehicle to reduce the length of data collection drives and/or reduce the likelihood of follow-up data collection drives. The system or online scenario detector may include aspects of the systems described in U.S. patent application Ser. No. 18/493,014, filed Oct. 24, 2023, which is hereby incorporated herein by reference in its entirety.

The sensor may comprise any suitable camera or sensor. Optionally, the camera may comprise a "smart camera" that includes the imaging sensor array and associated circuitry and image processing circuitry and electrical connectors and the like as part of a camera module, such as by utilizing aspects of the vision systems described in U.S. Pat. Nos. 10,099,614 and/or 10,071,687, which are hereby incorporated herein by reference in their entireties.

The system includes an image processor operable to process image data captured by the camera or cameras, such as for detecting objects or other vehicles or pedestrians or the like in the field of view of one or more of the cameras. For example, the image processor may comprise an image processing chip selected from the EYEQ family of image processing chips available from Mobileye Vision Technologies Ltd. of Jerusalem, Israel, and may include object detection software (such as the types described in U.S. Pat. Nos. 7,855,755; 7,720,580 and/or 7,038,577, which are hereby incorporated herein by reference in their entireties), and may analyze image data to detect vehicles and/or other objects. Responsive to such image processing, and when an object or other vehicle is detected, the system may generate an alert to the driver of the vehicle and/or may generate an overlay at the displayed image to highlight or enhance display of the detected object or vehicle, in order to enhance the driver's awareness of the detected object or vehicle or hazardous condition during a driving maneuver of the equipped vehicle.

The vehicle may include any type of sensor or sensors, such as imaging sensors or radar sensors or lidar sensors or ultrasonic sensors or the like. The imaging sensor or camera may capture image data for image processing and may comprise any suitable camera or sensing device, such as, for example, a two dimensional array of a plurality of photosensor elements arranged in at least 640 columns and 480 rows (at least a 640×480 imaging array, such as a megapixel imaging array or the like), with a respective lens focusing images onto respective portions of the array. The photosensor array may comprise a plurality of photosensor elements arranged in a photosensor array having rows and columns. The imaging array may comprise a CMOS imaging array having at least 300,000 photosensor elements or pixels, preferably at least 500,000 photosensor elements or pixels and more preferably at least one million photosensor elements or pixels arranged in rows and columns. The imaging array may capture color image data, such as via spectral filtering at the array, such as via an RGB (red, green and blue) filter or via a red/red complement filter or such as via an RCC (red, clear, clear) filter or the like. The logic and control circuit of the imaging sensor may function in any known manner, and the image processing and algorithmic processing may comprise any suitable means for processing the images and/or image data.

For example, the vision system and/or processing and/or camera and/or circuitry may utilize aspects described in U.S. Pat. Nos. 9,233,641; 9,146,898; 9,174,574; 9,090,234; 9,077,098; 8,818,042; 8,886,401; 9,077,962; 9,068,390; 9,140,789; 9,092,986; 9,205,776; 8,917,169; 8,694,224; 7,005,974; 5,760,962; 5,877,897; 5,796,094; 5,949,331; 6,222,447; 6,302,545; 6,396,397; 6,498,620; 6,523,964; 6,611,202; 6,201,642; 6,690,268; 6,717,610; 6,757,109; 6,802,617; 6,806,452; 6,822,563; 6,891,563; 6,946,978; 7,859,565; 5,550,677; 5,670,935; 6,636,258; 7,145,519; 7,161,616; 7,230,640; 7,248,283; 7,295,229; 7,301,466; 7,592,928; 7,881,496; 7,720,580; 7,038,577; 6,882,287; 5,929,786 and/or 5,786,772, and/or U.S. Publication Nos. US-2014-0340510; US-2014-0313339; US-2014-0347486; US-2014-0320658; US-2014-0336876; US-2014-0307095; US-2014-0327774; US-2014-0327772; US-2014-0320636; US-2014-0293057; US-2014-0309884; US-2014-0226012; US-2014-0293042; US-2014-0218535; US-2014-0218535; US-2014-0247354; US-2014-0247355; US-2014-0247352; US-2014-0232869; US-2014-0211009; US-2014-0160276; US-2014-0168437; US-2014-0168415; US-2014-0160291; US-2014-0152825; US-2014-0139676; US-2014-0138140; US-2014-0104426; US-2014-0098229; US-2014-0085472; US-2014-0067206; US-2014-0049646; US-2014-0052340; US-2014-0025240; US-2014-0028852; US-2014-005907; US-2013-0314503; US-2013-0298866; US-2013-0222593; US-2013-0300869; US-2013-0278769; US-2013-0258077; US-2013-0258077; US-2013-0242099; US-2013-0215271; US-2013-0141578 and/or US-2013-0002873, which are all hereby incorporated herein by reference in their entireties. The system may communicate with other communication systems via any suitable means, such as by utilizing aspects of the systems described in U.S. Pat. Nos. 10,071,687; 9,900,490; 9,126,525 and/or 9,036,026, which are hereby incorporated herein by reference in their entireties.

The system may utilize sensors, such as radar sensors or imaging radar sensors or lidar sensors or the like, to detect presence of and/or range to objects and/or other vehicles and/or pedestrians. The sensing system may utilize aspects of the systems described in U.S. Pat. Nos. 10,866,306; 9,954,955; 9,869,762; 9,753,121; 9,689,967; 9,599,702; 9,575,160; 9,146,898; 9,036,026; 8,027,029; 8,013,780; 7,408,627; 7,405,812; 7,379,163; 7,379,100; 7,375,803; 7,352,454; 7,340,077; 7,321,111; 7,310,431; 7,283,213; 7,212,663; 7,203,356; 7,176,438; 7,157,685; 7,053,357; 6,919,549; 6,906,793; 6,876,775; 6,710,770; 6,690,354; 6,678,039; 6,674,895 and/or 6,587,186, and/or U.S. Publication Nos. US-2019-0339382; US-2018-0231635; US-2018-0045812; US-2018-0015875; US-2017-0356994; US-2017-0315231; US-2017-0276788; US-2017-0254873; US-2017-0222311 and/or US-2010-0245066, which are hereby incorporated herein by reference in their entireties.

The radar sensors of the sensing system each comprise a plurality of transmitters that transmit radio signals via a plurality of antennas, a plurality of receivers that receive radio signals via the plurality of antennas, with the received radio signals being transmitted radio signals that are reflected from an object present in the field of sensing of the respective radar sensor. The system includes an ECU or control that includes a data processor for processing sensor data captured by the radar sensors. The ECU or sensing system may be part of a driving assist system of the vehicle, with the driving assist system controlling at least one function or feature of the vehicle (such as to provide autonomous driving control of the vehicle) responsive to processing of the data captured by the radar sensors.

The system may also communicate with other systems, such as via a vehicle-to-vehicle communication system or a vehicle-to-infrastructure communication system or the like. Such car2car or vehicle to vehicle (V2V) and vehicle-to-infrastructure (car2X or V2X or V2I or a 4G or 5G broadband cellular network) technology provides for communication between vehicles and/or infrastructure based on information provided by one or more vehicles and/or information provided by a remote server or the like. Such vehicle communication systems may utilize aspects of the systems described in U.S. Pat. Nos. 10,819,943; 9,555,736; 6,690,268; 6,693,517 and/or 7,580,795, and/or U.S. Publication Nos. US-2014-0375476; US-2014-0218529; US-2013-0222592; US-2012-0218412; US-2012-0062743; US-2015-0251599; US-2015-0158499; US-2015-0124096; US-2015-0352953; US-2016-0036917 and/or US-2016-0210853, which are hereby incorporated herein by reference in their entireties.

Changes and modifications in the specifically described embodiments can be carried out without departing from the principles of the invention, which is intended to be limited only by the scope of the appended claims, as interpreted according to the principles of patent law including the doctrine of equivalents.

The invention claimed is:

1. A vehicular training system, the vehicular training system comprising:
   a sensor disposed at a vehicle equipped with the vehicular training system and sensing exterior of the vehicle, wherein the sensor is operable to capture sensor data;
   an electronic control unit (ECU) comprising electronic circuitry and associated software;
   wherein the electronic circuitry of the ECU comprises a data processor for processing sensor data captured by the sensor;
   wherein sensor data captured by the sensor is transferred to and is processed at the ECU;
   wherein the vehicular training system, while the vehicle travels along a route for a data collection drive and while the sensor captures sensor data, determines, via processing at the ECU of sensor data captured by the sensor and transferred to the ECU, a quantity of sensor data that has been captured for training an advanced driving assistance system;
   wherein the vehicular training system, while the vehicle travels along the route for the data collection drive and while the sensor captures sensor data, compares the quantity of sensor data that is captured to a target quantity of sensor data to be captured by the vehicular training system for training the advanced driving assistance system;
   wherein the target quantity of sensor data is derived from a key performance indicator (KPI) associated with the data collection drive; and
   wherein the vehicular training system adjusts the route of the vehicle based at least in part on comparison of the quantity of sensor data that is captured and the target quantity of sensor data.

2. The vehicular training system of claim 1, wherein the sensor comprises one or more cameras.

3. The vehicular training system of claim 2, wherein the one or more cameras comprises a forward-viewing camera disposed at an in-cabin side of a windshield of the vehicle and viewing forward of the vehicle through the windshield of the vehicle.

4. The vehicular training system of claim 1, wherein the sensor comprises one or more radar sensors.

5. The vehicular training system of claim 1, wherein the sensor comprises one or more lidar sensors.

6. The vehicular training system of claim 1, wherein the adjusted route of the vehicle increases a probability of collecting sensor data to satisfy the target quantity of sensor data.

7. The vehicular training system of claim 1, wherein adjusting the route of the vehicle comprises determining, using a map database, a geographic location for capturing sensor data that satisfies the target quantity of sensor data.

8. The vehicular training system of claim 1, wherein the target quantity of sensor data is associated with at least one from the group consisting of (i) traffic signs, (ii) road types, and (iii) traffic scenarios.

9. The vehicular training system of claim 1, wherein comparing the quantity of sensor data that is captured to the target quantity of sensor data to be captured comprises determining a quantity of events of interest detected in the sensor data and comparing the determined quantity to the target quantity of sensor data.

10. The vehicular training system of claim 1, wherein the vehicular training system adjusts the route of the vehicle based on determining the target quantity of sensor data is not satisfied.

11. The vehicular training system of claim 1, wherein the vehicular training system provides a notification to an occupant of the vehicle, and wherein the notification comprises the comparison of the quantity of sensor data that is captured and the target quantity of sensor data.

12. A vehicular training system, the vehicular training system comprising:
   a camera disposed at an in-cabin side of a windshield of a vehicle equipped with the vehicular training system and viewing forward of the vehicle through the windshield of the vehicle, wherein the camera is operable to capture image data;
   an electronic control unit (ECU) comprising electronic circuitry and associated software;
   wherein the electronic circuitry of the ECU comprises an image processor for processing image data captured by the camera;
   wherein image data captured by the camera is transferred to and is processed at the ECU;
   wherein the vehicular training system, while the vehicle travels along a route for a data collection drive and while the camera captures image data, determines, via processing at the ECU of image data captured by the camera and transferred to the ECU, a quantity of image data that has been captured for training an advanced driving assistance system;
   wherein the vehicular training system, while the vehicle travels along the route for the data collection drive and while the camera captures image data, compares the quantity of image data that is captured to a target quantity of image data to be captured by the vehicular training system for training the advanced driving assistance system;
   wherein the target quantity of sensor data is associated with at least one from the group consisting of (i) traffic signs, (ii) road types, and (iii) traffic scenarios; and
   wherein the vehicular training system adjusts the route of the vehicle based at least in part on comparison of the quantity of image data that is captured and the target quantity of image data, and wherein the adjusted route of the vehicle increases a probability of collecting sensor data to satisfy the target quantity of sensor data.

13. The vehicular training system of claim 12, wherein adjusting the route of the vehicle comprises determining, using a map database, a geographic location for capturing sensor data that satisfies the target quantity of sensor data.

14. The vehicular training system of claim 12, wherein comparing the quantity of sensor data that is captured to the target quantity of sensor data to be captured comprises determining a quantity of events of interest detected in the sensor data and comparing the determined quantity to the target quantity of sensor data.

* * * * *